US009090511B2

(12) United States Patent
Rothbrust et al.

(10) Patent No.: US 9,090,511 B2
(45) Date of Patent: Jul. 28, 2015

(54) INORGANIC-INORGANIC COMPOSITE MATERIAL AND METHOD FOR PRODUCING THE SAME

(75) Inventors: Frank Rothbrust, Frastanz (AT);
Christian Ritzberger, Nenzing (AT);
Volker Rheinberger, Vaduz (LI);
Wolfram Höland, Schaan (LI)

(73) Assignee: Ivoclar Vivadent AG, Schaan (LI)

( * ) Notice: Subject to any disclaimer, the term of this patent is extended or adjusted under 35 U.S.C. 154(b) by 106 days.

(21) Appl. No.: 13/240,705

(22) Filed: Sep. 22, 2011

(65) Prior Publication Data

US 2012/0064490 A1 Mar. 15, 2012

Related U.S. Application Data

(62) Division of application No. 10/587,728, filed on Mar. 26, 2007, now Pat. No. 8,080,189.

(30) Foreign Application Priority Data

Jan. 27, 2004 (DE) .......................... 10 2004 004 059
Jan. 27, 2005 (WO) ................. PCT/EP2005/050444

(51) Int. Cl.
| | |
|---|---|
| A61C 13/007 | (2006.01) |
| B23P 13/00 | (2006.01) |
| A61C 13/083 | (2006.01) |
| A61C 8/00 | (2006.01) |
| A61C 5/10 | (2006.01) |
| C04B 35/48 | (2006.01) |
| C04B 35/488 | (2006.01) |

(52) U.S. Cl.
CPC ............. *C04B 35/481* (2013.01); *C04B 35/488* (2013.01); *Y10T 29/49568* (2015.01)

(58) Field of Classification Search
None
See application file for complete search history.

(56) References Cited

U.S. PATENT DOCUMENTS

| | | | |
|---|---|---|---|
| 4,626,392 A | 12/1986 | Kondo et al. | |
| 4,830,655 A | 5/1989 | Franek et al. | |
| 4,925,492 A | 5/1990 | Kelkar et al. | |
| 5,250,352 A * | 10/1993 | Tyszblat ..................... 428/306.6 |
| 5,447,967 A | 9/1995 | Tyszblat et al. | |
| 5,478,785 A | 12/1995 | Glass et al. | |

(Continued)

FOREIGN PATENT DOCUMENTS

| | | |
|---|---|---|
| EP | 0328316 | 8/1989 |
| JP | 11-502733 | 3/1999 |

(Continued)

OTHER PUBLICATIONS

Inwang et al: Zirconia Infiltration Toughening of Na-Beta-Alumina, London, GB, vol. 36, No. 7, Apr. 1, 2001, pp. 1823-1832.

(Continued)

*Primary Examiner* — David Sample
(74) *Attorney, Agent, or Firm* — Ann M. Knab; Thad McMurray

(57) ABSTRACT

Process for producing an inorganic-inorganic composite material, in which an open-pore, crystalline oxide ceramic shaped part is produced from an oxide ceramic powder or a powder of an oxide ceramic mixture after shape-imparting processing and presintering, an infiltration substance is applied to this shaped part in vacuo and at room temperature, and the oxide ceramic is sintered in a densifying manner under an air atmosphere and at ambient pressure to form an inorganic-inorganic composite material.

17 Claims, 5 Drawing Sheets

(56) References Cited

U.S. PATENT DOCUMENTS

| | | | |
|---|---|---|---|
| 5,695,337 A * | 12/1997 | Tyszblat Sadoun | 433/213 |
| 5,702,650 A * | 12/1997 | Hintersehr | 264/16 |
| 5,910,273 A | 6/1999 | Thiel et al. | |
| 6,071,622 A | 6/2000 | Beesabathina et al. | |
| 6,106,747 A | 8/2000 | Wohlwend | |
| 7,234,938 B2 | 6/2007 | Bodenmiller | |
| 2002/0010070 A1 * | 1/2002 | Cales et al. | 501/105 |
| 2002/0162482 A1 | 11/2002 | Giordano | |
| 2002/0197583 A1 | 12/2002 | Jones et al. | |
| 2008/0241551 A1 * | 10/2008 | Zhang et al. | 428/428 |

FOREIGN PATENT DOCUMENTS

| | | |
|---|---|---|
| JP | 2002320626 A | 11/2002 |
| JP | 2003-048770 A | 2/2003 |
| WO | 8802742 | 4/1988 |
| WO | WO9730654 A1 * | 8/1997 |
| WO | 9952467 | 10/1999 |
| WO | 2004032986 | 4/2004 |

OTHER PUBLICATIONS

Yung-Jen Lin et al: Cyclic Infiltration of Porous Zirconia Performs . . . , American Ceramic Soc USA, vol. 84, No. 1, Jan. 1, 2001, pp. 71-78.

Zhao R et al: Support and COPCTS Effects on the Catalytic Activity . . . , Science and Support Technology, vol. 19, No. 5-6, Jun. 2001, pp. 495-502.

Duran et al: Nanostructured and Near Defect-Free Ceramics by . . . , Chapman & Hall, UK, vol. 32, No. 17, Sep. 1, 1997, pp. 4507-4512.

Skala et al: Synthesis and Properties of Mullite/Zirconia Toughened Alumina (ZTA) Composites, International Ceramic Monographs. Proceedings of the International Ceramics Conference, Austceram 94 1994, vol. 1, pp. 161-166.

Laobuthee et al., :MGAL2O4 Spinel Powders From Oxide One Pot Synthesis Process for Ceramic Humidity Sensors, European Ceramic Society, vol. 20,(2000) pp. 91-97.

http://www.maruwa-g.com/e/products/ceramic/ceramic-substrate-2.html; Mauruwa; Zirconia Toughened Alumina; Jul. 23, 2014;2 pages.

http://www.goodfellow-ceramics.com/products/ceramics/alumina-toughened-zirconia/; Goodfellow-Ceramics; Alumina-toughened Zirconia; May 26, 2014; 2 pages.

Webster's Third New International Dictionary,Jan. 1, 1993, pp. 1192, Merriam-Webster.

* cited by examiner

INORGANIC-INORGANIC COMPOSITE MATERIAL AND METHOD FOR PRODUCING THE SAME

CROSS-REFERENCE TO RELATED APPLICATIONS

This application is a divisional application of U.S. application Ser. No. 10/587,728, filed Mar. 26, 2007, which is the national phase under 35 USC 371 of PCT International Application No. PCT/EP05/50444, which has an international filing date of Jan. 27, 2005, and which claims priority to German Patent Application No. 102004004059.1 filed Jan. 27, 2004, all of which are hereby incorporated by reference in their entirety.

The present invention relates to an inorganic-inorganic composite material, to a process for producing it and to its use.

It has long been known to use oxide ceramics in the dental sector. By way of example WO 95/35070 has disclosed a process in which the ceramic is infiltrated. However, an oxide ceramic of this type is relatively complex to produce; the infiltration step alone carried out in this solution takes four hours, for example.

Furthermore, EP-A1-834 366 has disclosed a ceramic workpiece which is produced by infiltrating a molten matrix material into the cavities of a blank. A particular particle size with two different size stages for the infiltration substance is provided. In this solution, an encasing material, which is provided with a water-soluble salt and has to be removed after infiltration and consolidation, is used. Drawbacks of this solution are the high process temperature during shaping and the complicated nature of production from an apparatus perspective.

Publication WO 88/02742 has disclosed the production of a surface-hardened ceramic part. A porous $Al_2O_3$ blank is infiltrated with a zirconium oxide infiltration substance, so that the finished ceramic workpiece contains from 1 to 15% by volume of zirconium oxide, and as a result the aluminum oxide ceramic formed in this way is strengthened. This process requires a plurality of infiltration steps and is appropriate if a ceramic, such as aluminum oxide, is to be reinforced at the surface; however, it will be understood that a zirconium oxide ceramic with a high critical stress intensity factor cannot be strengthened further by the addition of zirconium oxide. An aluminum oxide ceramic of this type is only reinforced at the surface, and to realize this solution, the process steps would often have to be employed in succession.

Furthermore, DE-A1-198 52 740 has disclosed the formation of a cap or other tooth replacement parts from aluminum oxide ceramic. The presintered shaped piece is infiltrated in the hot state with a glass which melts as a result of being introduced into the sintering furnace. In this solution, the infiltration takes about four hours and requires a high process temperature. Moreover, the process is not sufficiently controllable, and the mechanical properties of the tooth replacement part are relatively poor.

Moreover, DE-A1 100 61 630 has disclosed the production of a fully ceramic tooth replacement made from a dental ceramic comprising zirconium oxide and aluminum oxide, infiltration with glass being carried out in a volumetric range from 0-40%. When used as a tooth replacement, this solution requires the additional realization of a veneer ceramic. Drawbacks are the low strength of the ceramic which has been strengthened by the glass phase, and the low translucency.

Furthermore, EP-A1-1 025 829 has disclosed the production of a cap from a ceramic material infiltrated with a glass. Two additional layers, which are applied to the cap, are provided for the purpose of realizing the desired translucency. This is because when providing dental restoration parts, it is for aesthetic reasons essential to simulate the natural tooth enamel, which has a high translucency, whereas dentine has a lower translucency. The layers 7 and 6 of the abovementioned solution are used for this purpose. In a process of this type, the laborious further processing by milling the infiltrated solid to form a powder constitutes a drawback, as does the low strength of the ceramic strengthened by the glass phase.

DE-A1 101 07 451 has disclosed a process for producing an oxide ceramic shaped part in which after the presintering from a zirconium or aluminum oxide ceramic, milling is carried out using a large CAD/CAM system. Then, the milled blank is subjected to pressureless sintering at 1200 to 1650° C. The oxide ceramic phase produced in this way has a lower translucency than a hot isostatically pressed ceramic, the mechanical properties are worse than in the case of hot isostatically pressed ceramics, and these ceramics have very poor etching properties.

CH-A5 675 120 has disclosed zirconium oxide mixed ceramics which contain 7 to 12 percent by weight of $TiO_2$ and other additives which inhibit grain growth and are suitable for stabilization. 0 to 30 percent by weight of $Al_2O_2$ may also be present. The powder mixtures are sintered at 1100 to 1300° C. The drawback of these ceramics is that the density which can be achieved is only 98% of the theoretical density (TD) and is therefore lower than in the case of hot isostatically pressed ceramics. With this ceramic, it is very difficult to produce a retentive pattern on the surface.

WO 03/057065 describes the production of an oxide ceramic shaped part from aluminum oxide, wherein the mean grain size is no larger than 1 μm and the degree of translucency is 70% of T*nm, integrated over the wavelength range from 475-650 nm. In this patent, the process step of hot isostatic pressing is employed to achieve these properties, wherein a body of a desired shape is first of all obtained from a pulverulent raw material, and this body is then sintered in a thermal process so as to acquire only a closed porosity. To achieve the final properties, such as translucency, final density and final strength, the sintered shaped body undergoes further hot isostatic densification in order to be fully densified. This process step is highly complex: the body is densified at 100 to 219 MPa and a temperature of from 1200° C. to 1300° C.

Finally, it is known from the publication "Heiβisostatisches Pressen" [hot isostatic pressing] by B. W. Hofer (Heiβisostatisches Pressen, in: Technische Keramische Werkstoffe, Fachverlag Deutscher Wirtschaftsdienst, Ed. Kriegesmann J./Kap. 3.6.3.0, pp. 1-15, January 1993) that hot isostatic pressing produces materials which have scarcely any defects in the microstructure and achieve densities which are almost equal to the maximum that is theoretically possible. To achieve these properties, however, pressures of from 30 to 200 MPa at the sintering temperatures of over 1000° C. are required. Furthermore, this process has to take place in an inert gas atmosphere. The process engineering and the resulting equipment design are correspondingly complex. Drawbacks, therefore, are the expensive process, the complicated process engineering and the associated high investment and energy costs, with the result that for example for relatively small enterprises, such as dental laboratories, it is simply not possible to carry out this process.

By contrast, the invention is based on the object of providing a process for producing an inorganic-inorganic composite material which is suitable for the dental sector and allows cost-optimized production combined, at the same time, with an improved aesthetic effect without adversely affecting the use properties, in particular to offer a way of producing a retentive pattern and to ensure attachment to the natural tooth.

This object is achieved by a process for producing an inorganic-inorganic composite material, in which after shape-imparting processing and presintering of a powder containing oxide ceramic, an open-pore, crystalline oxide ceramic shaped part is produced, an infiltration substance is applied to this shaped part, preferably in vacuo and at room temperature, and under air atmosphere and at ambient pressure, the oxide ceramic is sintered in a densifying manner to form the inorganic-inorganic composite material.

In this case, the starting point for production is an open-pore crystalline oxide ceramic shaped part, the pores of which are filled at room temperature in vacuo, preferably in the range from 2 to 90% of the thickness of the open-pore oxide ceramic, with an infiltration substance with or without solvent, with or without coloring additions. The entire coated oxide ceramic is subjected to a dense-sintering process, preferably at high temperatures. This gives rise to a multilayer composite material which has a translucent region or core in the interior.

In the outer region, the composite material is white, colorless or colored. Accordingly, the invention allows the production of a translucent-colored product.

The invention also relates to an inorganic-inorganic composite material which contains components of oxide ceramics and of infiltration substances and the main use of which is in the dental sector.

When realizing the process according to the invention, the starting material provided is a powder or a powder mixture which are composed of corresponding oxide ceramic or a mixed ceramic. The powder is preferably in granule form and is preferably mixed with a binder. For this purpose, it is preferable for the metal oxides to be partially or completely covered with at least one monolayer of an organic polymer.

The binders or polymers used according to the invention are preferably water-soluble.

The binders or polymers which are preferred according to the invention include synthetic polymers or biopolymers. The polymers which can be used according to the invention include, for example, polyvinyl alcohol, polyethylenimine, polyacrylamide, polyethylene oxide, polyethylene glycol, homopolymers and copolymers of (meth)acrylic acid, maleic acid, vinylsulfonic acid and vinylphosphonic acid, polyvinylpyrrolidone, and biopolymers which can be used are in particular starch, alginate, gelatin, cellulose ethers, for example carboxymethylcellulose.

When realizing the process according to the invention, during or after the shape-imparting processing, for example by uniaxial or cold isostatic pressing of the pulverulent starting material, presintering to preferably 50% of the theoretical density is carried out in a pressureless ambient air atmosphere.

During the production of the crystalline open-pore oxide ceramic shaped part at high temperatures, the binders or organic polymers are removed without leaving any residues, with the result that the crystalline, open-pore oxide ceramic acquires a density of 10 to 90% of the theoretical density.

The presintering temperature is well below the sintering temperature and may, for example, be between 600 and 1300° C., preferably between 800 and 1200° C.

The open-pore, crystalline oxide ceramic shaped part obtained by presintering contains substantially oxides or oxide mixtures of the elements zirconium or aluminum or mixtures of these elements. These metal oxides or metal oxide mixtures may be mixed with further metal oxides. In particular the elements of groups IIIa, IIIb and IVb are suitable for this purpose, where a denotes the main group elements of the periodic system and b denotes the transition group elements of the periodic system.

According to the invention, in particular oxides of the metals Hf, Y, Al, Ce, Sc, Er and/or Ti are suitable as further metal oxides.

In a variant of the invention, the crystalline, open-pore oxide ceramic shaped part substantially contains zirconium oxide with additions of yttrium oxide, preferably in the range from 0.1 to 10 mol %.

In a form which is particularly preferred according to the invention, the zirconium oxide contains additions of from 2 to 4 mol % of yttrium oxide, 2.5 to 15 mol % of cerium oxide, 2.5 to 5 mol % of erbium oxide, 2.5 to 5 mol % of scandium oxide or 0.1 to 15 mol % of titanium oxide or mixtures of said oxides in the ranges mentioned above.

The zirconium oxide may in particular be in the form of a tetragonal oxide.

To implement the solution according to the invention, it is expedient to evacuate the partially sintered, open-pore oxide ceramic shaped part. According to the invention, it is preferable to use pressures of less than 100 mbar, preferably less than 50 mbar, for example approx. 20 mbar. The subatmospheric pressure is applied, for example, for 1 min to 4 h, so as to effect pressure balancing in the sense of the vacuum being formed in the interior of the partially sintered, open-pore oxide ceramic. During the evacuation, the gases are removed from the porous, partially sintered oxide ceramic. During this time, the sol according to the invention is stirred to provide the further material that is to be released. The application of this further material following the evacuation is carried out in the reduced-pressure atmosphere in a manner known per se. An infiltration substance is applied, preferably in vacuo and at room temperature, to the crystalline, open-pore oxide ceramic shaped part produced in the manner described.

For the subsequent dense-sintering, the thickness of the infiltration substance layer is preferably 2 to 30%, preferably 5 to 20% and particularly preferably approximately 10 to 15%, in each case based on the maximum diameter of the oxide ceramic shaped part. A significantly greater thickness of the infiltration layer may be required for coloring than for dense-sintering:

5-90%, preferably 10-90%, particularly preferably 30-85% of the thickness of the shaped part.

The infiltration substance can be applied in the presence of a solvent. Suitable solvents are both polar and nonpolar solvents. Examples include water or alcohol.

The infiltration substance may be either the precursor of a nonmetallic-inorganic phase, of an amorphous glass phase, of a hydrolysable compound of a metal or of an alkoxide of a metal.

The precursor of the nonmetallic-inorganic phase may have ionogenic or covalent compounds of the elements of the following main groups (denoted by a) and transition groups (denoted by b): Ia, IIa, IIIa, IVa, IIIb, IVb, Vb, VIIb, VIIb and VIIIb. Mixtures of the elements mentioned are also suitable.

Covalent compounds of silicon or zirconium are preferred according to the invention. It is also possible to use known coloring ionogenic compounds of the elements cerium, manganese, vanadium, iron and others.

The infiltration substance comprising nonmetallic-inorganic phase which at least partially covers the inner region is significantly less chemically resistant to acids than the pure crystalline oxide ceramic in the core or inner region. The layer can easily be etched into. However, the chemical resistance is not significantly lower than in the core or inner region if the covering layer includes only microcrystalline zirconium oxide.

On account of the lower chemical resistance of the infiltration substance which at least partially covers the inner region, a retentive pattern can be achieved there by etching. The depth of this pattern can be determined by the etchant, its concentration and the duration of the action in the etching operation. According to the invention, it corresponds to at most the thickness of the covering layer, since the core or inner region is significantly more resistant to the chemical attack.

The amorphous glass phase may be a silicate glass. Alkali-metal-free silicate glasses, inter alia, are preferred.

The hydrolysable compound used may, inter alia, be tetraethyl orthosilicate. It is also possible to use hydrolysable silanes.

Alkoxide compounds are also preferred. This means it is possible to use alkoxides of metals selected from the group of elements consisting of aluminum, titanium, zirconium or silicon.

Alkoxides of silicon or aluminum are particularly preferred. According to the invention, it is also possible to use mixtures of the alkoxides mentioned.

According to the invention, it is particularly expedient if the infiltration substances are in sol form and react further to form a gel. They are preferably precursor products of a vitreous or ceramic material. The sol is introduced into a reduced-pressure chamber, for example a desiccator. The infiltration substance must completely cover the shaped body. With the assistance of the vacuum, the infiltration substance penetrates into the oxide ceramic shaped body over a very short time, according to the invention, of approximately 1 minute to a few minutes. The subatmospheric pressure causes the stirred sol to be sucked into the reduced-pressure chamber, and penetration takes place over a very short time according to the invention, such as for example preferably 1 minute. The result is an infiltration substance layer with the desired layer thickness, which can be adjusted by means of the infiltration duration, the viscosity of the sol, the porosity of the partially sintered ceramic shaped part and also the level of the sub-atmospheric pressure.

To be able to satisfy the aesthetics required in modern dentistry, the shaped parts have to have different colors. Therefore, the coloring components can be added to the infiltration substance itself, or alternatively the coloring is carried out in a separate process step.

The formation of the layer of the infiltration substance can surprisingly be realized in a simple way and a very uniform thickness. On account of the short infiltration time, the infiltration substance only has time to cover the surface of the shaped part. When air is admitted to the reduced-pressure chamber, the infiltration substance is practically sucked into the shaped body as a result of the vacuum which is present therein. It will be understood that the viscosity of the infiltration substance, which is preferably in gel form, has a crucial influence on the depth of penetration. On account of the capillary action of the pores of the open-pore oxide ceramic shaped part, a low viscosity generates a large layer thickness of the infiltration substance layer, whereas a high viscosity reduces the depth of penetration.

After air has been admitted to the reduced-pressure chamber and the applied sol has solidified to form a gel, the firing at the preselected sintering temperature is carried out in an ambient air atmosphere. The sintering temperature is, for example, 1000 to 1600° C., and the sintering takes place at ambient pressure in an air atmosphere. The process according to the invention improves the sintering properties of the pure crystalline oxide ceramic in such a manner as to achieve virtually complete dense-sintering of the ceramic.

According to the invention, the sintering at, for example, 1480° C. results in a theoretical density of the composite material of 99.9%, in which context it is expedient that it is possible to operate in ambient air during the sintering.

The open-pore oxide ceramic shaped part can be produced in prepressed form and the desired shape. It is possible to carry out milling or some other form of chip-removing machining either after the presintering or after the dense-sintering. The advantage of the first option is that the shape-imparting from the open-pore oxide ceramic shaped part is relatively easy, since the final hardness has not yet been reached. By contrast, in the case of the latter option, very hard materials, such as diamond grinding wheels, have to be used for the machining of the inorganic-inorganic composite material, but the geometry is not affected by a further shrinkage process.

The process according to the invention allows the production of an inorganic-inorganic composite material from zirconium oxide with a predominantly tetragonal phase fraction and only a very small cubic phase fraction, provided that the sintering temperature of 1500° is not exceeded. According to the invention, it is possible in a surprisingly simple way to produce a translucency comparable to that attained by the hot isostatic pressing process. An additional advantage over hot isostatically pressed ceramics is that adhesion by etching at the infiltration substance layer is readily possible.

The invention can particularly expediently be used in combination with zirconium oxide ceramic or mixed ceramics with a high zirconium oxide content; suitable doping, such as with yttrium, and admixtures may also be expedient. In the case of these high-strength ceramics, the bending strength in the core or inner region is high, whereas the fracture toughness is particularly high in the infiltration substance layer, which comprises the open-pore, crystalline oxide ceramic and the infiltration substance which penetrates through the open-pore crystalline oxide ceramic or penetrates into the pores of the oxide ceramic.

Therefore, in the pure crystalline oxide ceramic core, the composite material according to the invention produced in this way has optical and mechanical properties which are even equivalent to those achieved with hot isostatically pressed materials. The properties of the pure crystalline oxide ceramic are obviously realized on the basis of the density of the microstructure.

The solution according to the invention makes it possible, in a surprisingly simple way, to achieve the strength properties which can be achieved by hot isostatic pressing in accordance with the prior art disclosed hitherto, without the need for the time-consuming hot isostatic pressing process. In an inorganic-inorganic composite material obtained in accordance with the invention, the biaxial strength is no less than 800 MPa. The fracture mechanics properties of the pure crystalline oxide ceramic, using the indenter method and the Evans & Charles calculation, gave critical stress intensity factors $K_{IC}$ of, for example, 6.95 MPa*$m^{1/2}$ and in comparative terms were even higher than in the case of corresponding hot isostatically pressed ceramics. It is in this context surprising that the properties of hot isostatically pressed materials are even inferior to predominantly tetragonal zirconium oxide as crystalline oxide ceramic. An increase in the strength of the inner region of the oxide ceramic can surprisingly be achieved with the aid of the infiltration substance layer in vacuo and the subsequent heat treatment. In particular, surrounding or at least partially covering the open-pore oxide ceramic with the infiltration substance stabilizes it to such an extent that a considerably improved fracture toughness of greater than 6.5 MPa m$^{1/2}$ can be achieved.

In one embodiment, a material-removing machining operation, which preferably involves CAD/CAM technology, is carried out after the full sintering. In this case, the covering layer is completely or partially removed and the translucent core reaches the surface. As a result, the final shaping of the composite material to be formed can take place. If covering layer still remains on sections of the surface, it is subsequently etched.

A retentive pattern can be obtained in the regions where the outer layer is retained. At the same time, a dense, translucent microstructure is obtained at the surface at the locations where the layer has been removed. As a result, an aesthetic effect which corresponds to that of hot isostatically pressed, comparable materials is produced in a surprisingly simple way. The high density of the microstructure results in a higher light transmission (translucency), which corresponds to that of the hot isostatically pressed ceramic.

The composite materials produced in this way can be used in particular in the dental sector. This includes in particular their use as dental restorations, implants, implant components or orthodontic products. Suitable examples in dental restoration include in particular dental frameworks, crowns, partial crowns, bridges, caps, shells, veneers, abutments or post structures.

The composite material may in this case be in the form of a monolithic block or a cylinder. These can be adhesively secured for example to a holder. The monolithic block and cylinder are configured in such a way that they can be machined, i.e. can be worked by forming chips.

Surprisingly, the solution according to the invention also leads to a significant improvement to the aesthetic effect of a dental restoration part if the oxide ceramic part according to the invention is used as a dental restoration part. The inner region of the crystalline oxide ceramic is translucent.

The solution according to the invention makes it possible to dispense with an additional veneer ceramic, thereby also eliminating the associated problems, such as the longer duration of the process, the adhesion problems and the required layer thickness of the veneer ceramic. By contrast, the solution according to the invention is also suitable in particular for realizing fine-structured yet nevertheless very aesthetically attractive dental products. In particular if the infiltration substance layer includes a silicate phase, it can, for example, be etched away using HF and then adhesively bonded to other materials.

However, it is also possible for a single-layer veneer to be applied to form a dental restoration part, in order to produce an even better aesthetic effect. In the regions in which a retentive pattern has been produced, it is possible to apply any desired adhesive and cement materials. It is preferable to use adhesive systems. According to the invention, adhesive attachment is possible in a surprisingly simple way, whereas this is not possible with comparable hot isostatically pressed materials. Chemically light-curing or dual-curing agents are preferably used for the adhesive agents. Examples of cement materials are zinc phosphates. Therefore, the composite material according to the invention, in a simple way, offers better adhesive securing combined with the same aesthetic effect as hot isostatically pressed comparable materials. Moreover, the sintering operation is significantly simpler and is thereby considerably less expensive than the hot isostatic pressing operation.

It is in principle also possible to make use of the advantages of the process according to the invention in ceramic shaped parts used in other ways, for example including for the provision of the parts of artificial joints, in which case the surface infiltration substance layer has favorable properties with regard to the low abrasion combined, at the same time, with good hardness and offers a surface with a hardness comparable to that of glass, and also for surgical implants or parts thereof. Endodontic parts, such as root canal posts, can also be produced using the process according to the invention, in which application it is also possible to make use of the good adhesion to other shaped parts.

The time required to produce an inorganic-inorganic composite material according to the invention is very much dependent on the time required for the desiccation, i.e. for producing the reduced pressure. Although the provision of the infiltration substance requires a not inconsiderable stirring time and standing time in an expedient exemplary embodiment of the invention, if the times are suitably adapted, the stirring of the infiltration substance can be commenced well in advance, i.e. for example while the blank is being pressed or at the latest during the presintering, and consequently this time is not included in the cycle time for the provision of a finished oxide ceramic shaped part.

The pure infiltration time may, for example, last 1 or 2 minutes and at any rate generally no longer than 10 minutes, while the full sintering can be realized at maximum temperature within for example 30 minutes. The entire sintering process for the full sintering takes place over 5 to 9 hours.

Further advantages, details and features will emerge from the following description of a plurality of exemplary embodiments with reference to the drawings, in which.

Figure 3:
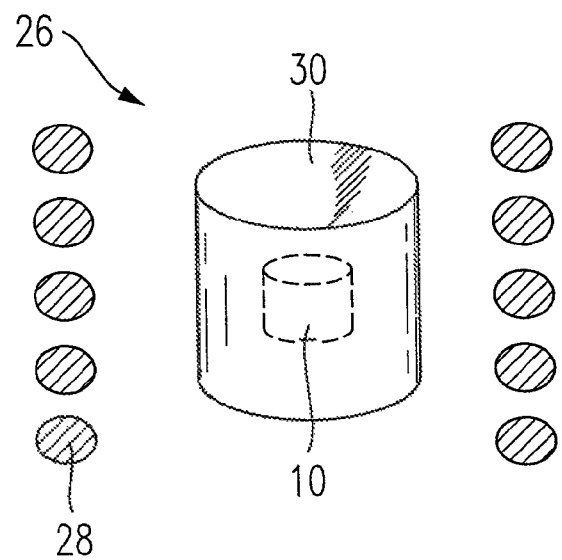
Figure 4:
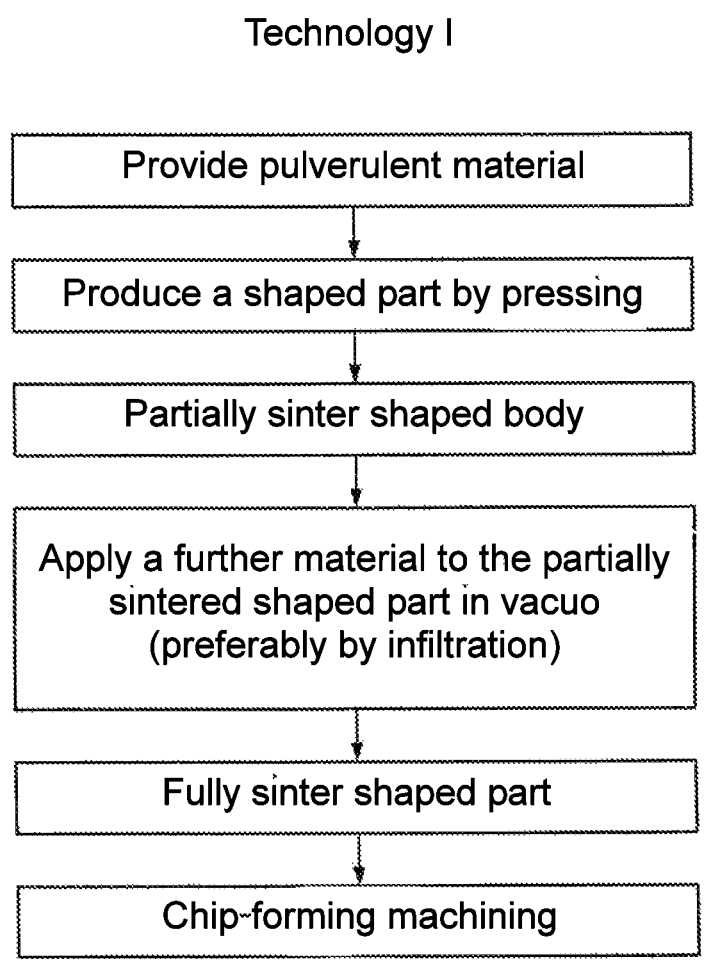
Figure 5:
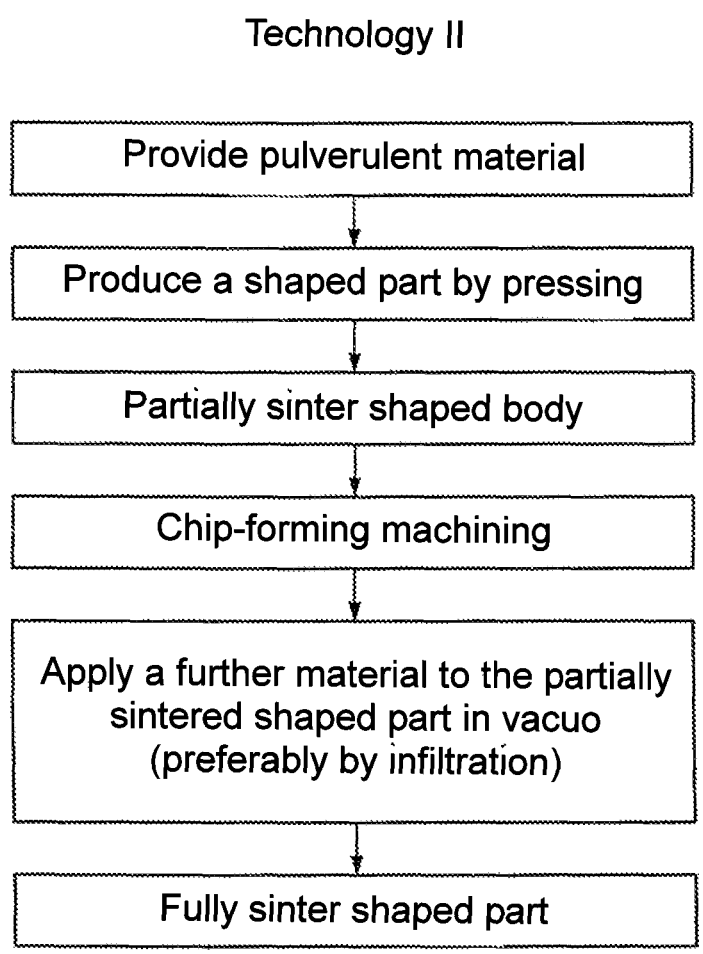
Figure 6:
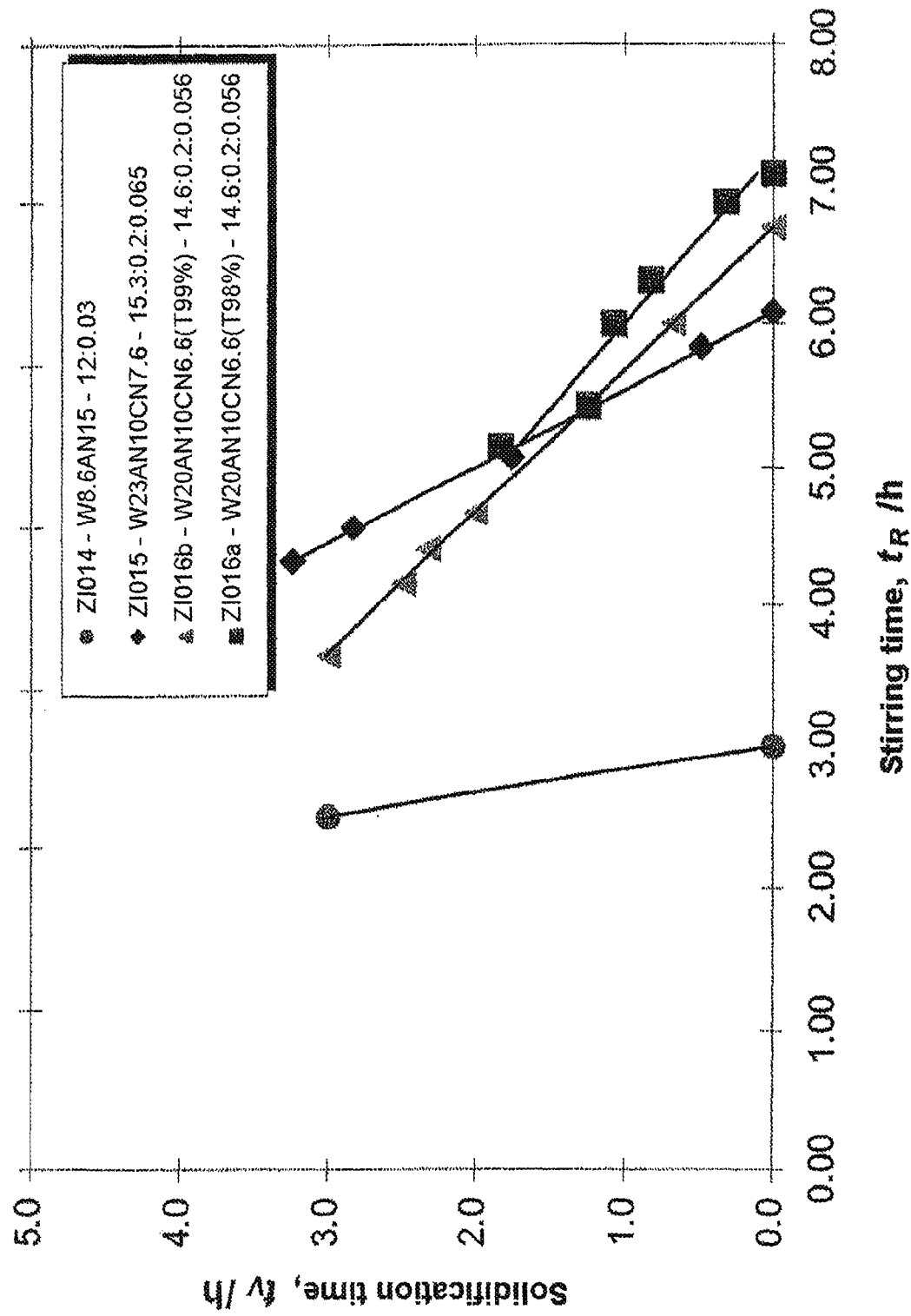

FIG. 3 diagrammatically depicts a sintering furnace for the infiltrated oxide ceramic part;

FIG. 4 shows a schematic view of a first process according to the invention in an embodiment;

FIG. 5 shows a schematic view of a process according to the invention in a second embodiment; and FIG. 6 shows the solidification time plotted against the stirring time.

Figure 1:
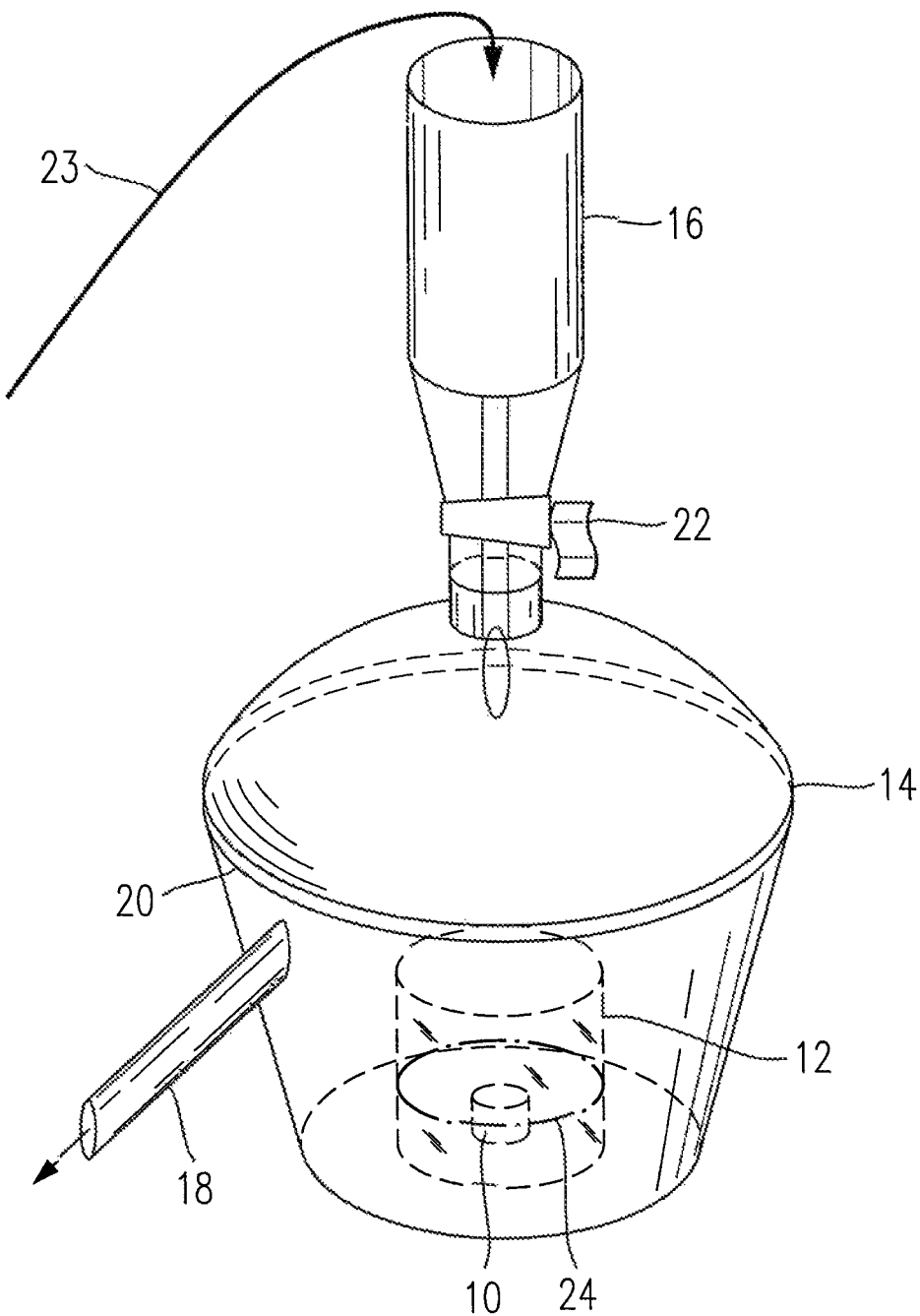
FIG. 1 shows the realization of the infiltration according to the invention for providing the infiltration layer on the oxide ceramic part in one embodiment of the invention.

FIG. 1 diagrammatically depicts how an oxide ceramic according to the invention can be infiltrated. The blank 10 is presintered and located in a beaker 12. The beaker 12 is positioned in a desiccator 14 with a dropping funnel 16 mounted on its lid.

Furthermore, the desiccator has, in a manner known per se, a reduced-pressure connection hose 18 which is connected to a reduced-pressure pump. The desiccator closes in a manner known per se at its ground sealing edge 20 by means of reduced pressure and can be opened after air has been admitted. The dropping funnel does not have any pressure equalization, but a control tap is provided, allowing precision setting of the dropping rate.

The infiltration is fundamentally carried out in such a way that a prepared sol 23 as infiltration substance is introduced into the dropping funnel 16 after the desiccator 14 has been brought to a reduced pressure of, for example, 20 mbar.

As soon as the desired pressure has been reached, the control tap 22 is opened in the desired way. The beaker 12 fills up with infiltration substance up to the filling level 24, and this infiltration substance subsequently enters the blank 10. The infiltration substance can penetrate uniformly into the shaped part substantially on all sides, depending on the configuration of the supporting surface in the beaker.

Although FIG. 1 illustrates a cylindrical blank 10, it will be understood that in practice predetermined shaped bodies which are placed on the bottom of the beaker 12 and wetted with infiltration substance are realized. An infiltration layer with a thickness of from 0.3 to 0.6 mm has formed after an infiltration time of just 1 min.

Figure 2:
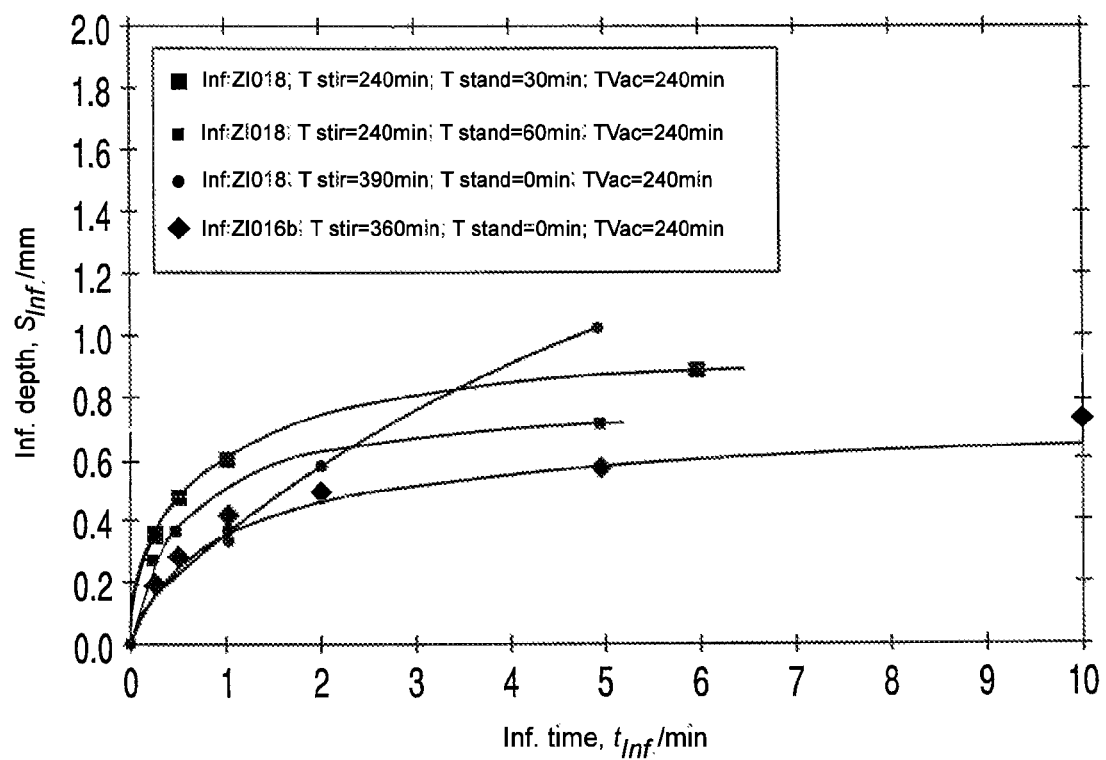
FIG. 2 shows the infiltration layer thickness, plotted against the infiltration time.

FIG. 2 shows the infiltration depth plotted against the infiltration time. According to the invention, it is expedient that the layer thickness can be adapted to requirements within wide ranges. For example, in the case of very fine and thin oxide ceramic parts, it is possible to use a relatively small infiltration layer thickness which nevertheless allows the inner region to have a good strength.

FIG. 3 diagrammatically depicts a sintering furnace 26. It has a multiplicity of heating elements 36 surrounding a crucible 30 in which the blank 10 is arranged after infiltration. The crucible is preferably equipped, in a manner known per se, with a powder bed, and full sintering of the blank 10 to form the composite material takes place within less than 1 hour. The external dimensions of the blanks, when using a cylindrical shape, may have a diameter of approx. 5 to approx. 20 mm and a length of up to approx. 100 mm; the cuboidal blanks have preferred dimensions (L×B×H) of approx. 10 mm*10 mm*5 mm to approx. 150 mm*150 mm*25 mm. The dental shaped part produced therefrom, as a result of the use of material-removing processes, has smaller dimensions.

The text which follows describes exemplary embodiments in detail.

Exemplary Embodiment 1

The raw material used for the blank 10 is dry-pressed granules of $ZrO_2$ powder. The granules are doped with yttrium and also include other components, such as $Al_2O_3$. By way of example, it is possible to use dry-pressed granules produced by TOSOH under the designations TZ-3YB and TZ-8YB, which have a primary crystallite size of 280-400 nm and a granule size of 50 μm, or alternatively the granules TZ-3Y20AB, which is additionally distinguished by 20% $Al_2O_3$ and otherwise corresponds to the other granules.

Pulverulent, oxidic raw materials were added to the zirconium oxide ceramics in specific mol fractions as represented by the table below:

| Oxide raw material | TZ3YB | | | | | | TZ8YB | |
|---|---|---|---|---|---|---|---|---|
| $CeO_2$/mol-% | 2.5 | 5 | 8 | 10 | 15 | — | " | |
| $Er_2O_3$ | 2.5 | 5 | — | — | — | — | — | |
| $CeO_2$ + $Er_2O_3$/mol-% | 3 + 3 | — | — | — | — | — | — | |
| $Sc_2O_3$/mol-% | 3 | — | — | — | — | — | — | |
| $TiO_2$/mol-% | 10 | 15 | — | " | ' | — | 10 | 15 |

The tests according to the invention used cylindrical press molds with internal diameters of 12 and 16 mm. The blank 10 was pressed in a manner known per se using pressures of 500, 600 to 1100 bar, during which the pressing pressure was reached in 5 seconds, then the maximum pressure was held for 15 seconds, and then the pressure was reduced again over the course of a further 5 seconds.

This was followed by the preliminary densification, which at the same time included the debinding, in accordance with the following table, in which the successive time sections of the presintering are indicated by ramp:

| Ramp | $vRn$/° C. | $vRn + 1$/° C. | Heat-up rate /K min$^{-1}$ | K h$^{-1}$ | Time /min | /h |
|---|---|---|---|---|---|---|
| 1 | 0 | 320 | 2.5 | 150 | 128 | 2:08 |
| 2 | 320 | 470 | 1 | 60 | 150 | 2:30 |
| 3 | 470 | 1100 | 2.5 | 150 | 252 | 4:12 |
| 4 | 1100 | 1100 | 0 | 0 | 20 | 0:30 |
| | | | | | 560 | 9:20 |

The powder contained binder as pressing auxiliary, and as a result of the dry pressing and subsequent debinding, the binder used is burnt out and the blank becomes porous. This is followed by the presintering. After the presintering, the result is a shaped part with approx. 50% TD.

The evacuation of the blank 10 was carried out in the glass desiccator 14 to a final pressure of approximately 20 mbar. On account of the relatively long evacuation time, which at least lasted more than an hour, the gases enclosed in the porous blank were removed as far as possible.

The infiltration substances used were substances based on tetraethyl orthosilicate (TEOS). TEOS was stirred together with water with a catalyst of aluminum nitrate nonahydrate $(Al(NO_3)_3)\times 9H_2O)$ to form a sol. Depending on the stirring time and the subsequent standing time, the sol reacts slowly to form a gel and condenses in a glass-like structure. Cerium nitrate hexahydrate was also added to the actual catalyst.

It was attempted to provide the infiltrate in such a way that after the infiltration a solid gel is quickly formed in the infiltration layer, which gel after sintering is converted into a silicate glass phase. According to the invention, the infiltration layer consists of predominantly tetragonal crystalline zirconium oxide phase and amorphous glass phase, substantially condensed TEOS, while the core of the oxide ceramic part according to the invention substantially comprised zirconium oxide having the abovementioned doping, likewise predominantly in tetragonal phase.

The testing of various mixing ratios of TEOS, Al $(NO_3)_3\times 9H_2O$ and $Ce(NO_3)_3\times 6H_2O$ revealed the trend whereby the solidification time, i.e. the standing time required for solidification, decreases with a longer stirring time. Please see FIG. 6. The sum total of the times was generally 6 to 7 hours; if cerium nitrate hexahydrate is not added, solidification was established after a stirring time of just 3 hours with certain mixing ratios, as shown in FIG. 6.

The prepared infiltration substance was then introduced into the dropping funnel and the control tap 22 was opened, specifically wide enough for the blank at least to be completely covered after the admission of the sol but without too much infiltration substance in the dropping funnel delaying the admission of air.

The admission of air was effected by completely opening the control tap once the dropping funnel 16 was empty.

The infiltration substance which penetrates into the desiccator and is as a result placed under reduced pressure initially formed a foam, with the reduced pressure being maintained.

As can be seen from FIG. 2, the infiltration depth is dependent not only on the viscosity of the infiltration substance used (cf. the difference between ZIO15 and ZIO16b), but also in particular on the stirring time and the standing time of the infiltration substance.

The intention is to select the time adjustment in such a way that the solidification of the infiltrate commences after or during the infiltration. It is not critical if the infiltration substance has already solidified, in which case sealing of the layer is produced even with liquid infiltration substance since a liquid infiltration substance also closes up the pores in the blank 10.

Residues of infiltration substance on the ceramic blank were then briefly cleaned off using a cloth, followed by air drying; in the tests carried out according to the invention, the air drying lasted 1 to 2 hours.

The full sintering took place in the same sintering furnace which was used for the presintering, and the firing curve was realized in 3 time sections, in accordance with the table below.

| Ramp | vRn/° C. | vRn + 1/ ° C. | Heat-up rate /K min$^{-1}$ | K h$^{-1}$ | Time /min | /h |
|---|---|---|---|---|---|---|
| 1 | 0 | 1000 | 5 | 300 | 200 | 3:20 |
| 2 | 1000 | 1480 | 2.5 | 150 | 192 | 3:12 |
| 3 | 1480 | 1480 | 0 | 0 | 30 | 0:30 |
|   |   |   |   |   | 422 | 7:02 |

In this case, the blanks were encapsulated in a quartz frit or Al$_2$O$_3$ powder bed in an aluminum oxide crucible.

As a result, the sintered blank samples had an infiltration substance layer thickness which differed as a function of the infiltration time.

The result was a good translucency of the oxide ceramic shaped part, and in the interior of the blanks there was a tetragonal phase with a mean crystallite size of 0.4 to 0.5 micrometers.

The smallest infiltration depth reached by the infiltrates of TEOS on the above basis was approximately 180 micrometers.

Exemplary Embodiment 2

In a modified exemplary embodiment, a zirconium (IV) propoxide was used instead of TEOS. It was precipitated at atmospheric pressure using water in the pores of the blank to form zirconium oxide particles. It was in this way too possible to close the pores, with crystalline particles being deposited in the pores, corresponding to the actual base material. The minimum layer thickness of the infiltration substance layer achieved in this way was about 50 micrometers.

Exemplary Embodiment 3

The overall result of the process according to the invention was an inorganic-inorganic composite material with a high fracture toughness, the translucency properties corresponding to those of zirconium ceramics (TZP) produced using hot isostatic pressing.

| Specimen | Ptr/ bar | T$_{inf}$/ min | V$_{Br}$/ ° C. | Density (in/g cm$^{-3}$) | Translucency (comparison) % | HV 10/ MPa | K$_{IC}$- (Evans & Charles)/ MPa M$^{1/2}$ |
|---|---|---|---|---|---|---|---|
| AL 238 | 1000 | 1 | 1480 | 6.08 | 70.5 | — | — |
| AL 237 | 1000 | 5 | 1480 | 6.10 | 75.0 | — | — |
| AL 240 | 1000 | 2 | 1480 | — | — | 13220 | 6.95 |
| AL 245 | 900 | 1 | 1480 | — | — | 13055 | 6.55 |
| AL 246 | 900 | 1 | 1480 | 6.08 | 72.2 | — | — |
| Metoxit Bio-HIP ZrO$_2$ (comparison measurement) | Not Known | Not Known | Not Known | 6.07 | 70.3 | 12850 | 6.65 |
| Denzir 00 HIP-ZrO$_2$ (comparison measurement) | Not known | Not known | Not known | 6.10 | 76.4 | 12830 | 6.70 |
| AL 253 | 900 | Not infiltrated | 1480 | 5.88 | 56.4 | — | — |
| AL 254 | 900 | Not infiltrated | 1480 | — | — | 12900 | 6.17 |

It is clear from the above that the specimens which have been conventionally sintered and not produced by the example according to the invention have significantly worse properties with regard to the transmission of light and the fracture toughness.

Exemplary Embodiment 4

Moreover, following the process according to the invention, some specimens were etched using HF, resulting in an etched pattern which matched the duration of the etching. Etching tests in which the outer layer was completely etched away so that only the inner oxide ceramic core remained were also carried out. Locations can also deliberately be left unetched by covering the infiltration material layer with waxes or a polymer layer.

Exemplary Embodiment 5

A cylindrical shaped body with a diameter of 12 mm and a height of 25 mm was produced in the manner described above by pressing granules produced by Tosoh (TZ3YB), and then presintered at 1100° C. in accordance with the invention. Thereafter, for the shape-imparting machining, an oversized crown was produced on a Cerec® Inlab milling machine produced by Sirona. The oversize had to be set in such a way that after the shrinkage during sintering and the partial etching-away of the covering layer, an optimum accuracy of fit was produced on the model framework. According to the invention, the partially sintered and milled oxide ceramic shaped part obtained in this way was provided with a covering layer in vacuo, with the applied material having penetrated slightly into the surface of the porous, partially sintered shaped body. During the subsequent sintering operation in an air atmosphere and at ambient air pressure, a fully sintered crown was then produced, which after the partial etching-away of the covering layer on the one hand had a retentive pattern and on the other hand had a good accuracy of fit on the model framework.

Exemplary Embodiment 6

In a further test, a solution consisting of 2.03% by mass FeCl$_3$, 1.08% by mass MnCl$_2$*4H2O, 7.0% by mass PEG20000 and the solvent water was used for infiltration for 2 min. in accordance with the invention, followed by drying.

After the dense-sintering, the result was a yellow-brown coloration of the material in accordance with LAB values, as follows:

$L^*=81.6$ $a^*=0.39$ $b^*=17.48$ $C=17.46$

By contrast, the uncolored, pressureless sintered $ZrO_2$ ceramic of type (TZ3YB from Tosoh) had the following LAB values:

$L^*=90.45$ $a^*=-0.57$ $b^*=4.36$ $C=4.39$

The measurement of the L, a, b values was carried out in accordance with British Standard BS 5612 (1978).

FIGS. 4 and 5 each illustrate the sequence of process steps in various embodiments of the process according to the invention. What is different is the chip-forming machining prior to the infiltration in the process referred to as technology II, whereas in the process corresponding to technology I (FIG. 4) the chip-forming machining takes place after full sintering. The process shown in FIG. 4 requires a higher outlay on tooling, in particular in view of the high strength of the securely fully sintered dental replacement part, but does offer somewhat greater accuracy.

Overall, the tests according to the invention resulted in oxide ceramics with a high fracture toughness of at least 6.5 $MPa^*m^{1/2}$, with the translucencies corresponding to those of oxide ceramics produced using hot isostatic pressing.

What is claimed is:

1. A sintered inorganic-inorganic composite material, comprising
   (a) a translucent inner region made from a crystalline oxide ceramic resulting from an open-pore structure and consisting of zirconium oxide and one or more oxides selected from the group consisting of elements of groups IIIb and IVb, and
   (b) a layer of an infiltration substance which at least partially surrounds or covers the inner region, the infiltration substance layer resulting from sintering a precursor that was infiltrated at room temperature, the precursor selected from a precursor of a nonmetallic-inorganic phase, a precursor of an amorphous glass phase, a precursor of a hydrolysable compound of a metal, or a precursor from an alkoxide of a metal selected from the group of elements consisting of Al, Ti, Zr or Si, and
   (c) a theoretical density of >99.5%, a biaxial strength of not less than 800 MPa and a fracture toughness of more than 6.5 $MPa\ m^{1/2}$.

2. The composite material as claimed in claim 1, wherein the crystalline oxide ceramic consists of zirconium oxide and additions of yttrium oxide.

3. The composite material as claimed in claim 1, wherein the zirconium oxide consists of additions of from 2 to 10 mol %, yttrium oxide, or of 2.5 to 15 mol % cerium oxide, or 2.5 to 5 mol % erbium oxide or 2.5 to 5 mol % scandium oxide, or 0.1 to 15 mol % titanium dioxide or mixtures of two or more of the abovementioned oxides in the quantities indicated.

4. The composite material as claimed in claim 1, wherein the zirconium oxide consists of additions of from 2 to 4 mol % yttrium oxide.

5. The composite material as claimed in claim 1, wherein the zirconium oxide is tetragonal zirconium oxide.

6. The composite material as claimed in claim 1, wherein the precursor of the non-metallic-inorganic phase comprises ionogenic or covalent compounds of the elements of groups Ia, IIa, IIIa, IVa, IIIb, IVb, Vb, VIb, VIIb, VIIIb, where "a" denotes the main groups and "b" denotes the transition groups of the periodic system of the elements.

7. The composite material as claimed in claim 1, wherein the infiltration substance comprises covalent bonds of Si and/or Zr.

8. The composite material as claimed in claim 1, wherein the infiltration substance comprises ionogenic compounds.

9. The composite material as claimed in claim 8, wherein the ionogenic compounds comprise Ce, Mn, V, Fe or mixtures of said elements.

10. The composite material as claimed in claim 1, wherein the amorphous glass phase is silicate glass.

11. The composite material as claimed in claim 10, wherein the silicate glass is an alkali-metal-free silicate glass.

12. The composite material as claimed in claim 1, wherein the infiltration substance comprises tetraethyl orthosilicate as a hydrolysable compound.

13. The composite material as claimed in claim 1, wherein the infiltration substance comprises alkoxides of silicon or aluminum.

14. The composite material as claimed in claim 1, wherein the inner region is translucent and the layer of infiltration substance is cloudy-white.

15. The composite material as claimed in claim 1, wherein the inner region has a translucency which corresponds to that of hot isostatically pressed sintered ceramics.

16. A method of using the inorganic-inorganic composite material as claimed in claim 1, in the dental sector, as a dental restoration, implant, implant part or orthodontic product.

17. The method of claim 16, wherein the dental restoration is a dental framework, a crown, a partial crown, a bridge, a cap, a shell, a veneer, an abutment or a post structure.

* * * * *